United States Patent
Cambou et al.

(10) Patent No.: US 11,310,062 B2
(45) Date of Patent: Apr. 19, 2022

(54) SECURING PHYSICALLY UNCLONABLE FUNCTIONS WITH ADDITIONAL RANDOM TERNARY STATES

(71) Applicant: Arizona Board of Regents on Behalf of Northern Arizona University, Flagstaff, AZ (US)

(72) Inventors: Bertrand Francis Cambou, Flagstaff, AZ (US); Raul Chipana, Flagstaff, AZ (US); Bilal Habib, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 99 days.

(21) Appl. No.: 16/492,910

(22) PCT Filed: Mar. 30, 2018

(86) PCT No.: PCT/US2018/025426
§ 371 (c)(1),
(2) Date: Sep. 10, 2019

(87) PCT Pub. No.: WO2018/183866
PCT Pub. Date: Oct. 4, 2018

(65) Prior Publication Data
US 2020/0076623 A1 Mar. 5, 2020

Related U.S. Application Data

(60) Provisional application No. 62/480,151, filed on Mar. 31, 2017.

(51) Int. Cl.
*H04L 9/32* (2006.01)
*G06F 7/58* (2006.01)
(Continued)

(52) U.S. Cl.
CPC ............ *H04L 9/3278* (2013.01); *G06F 7/588* (2013.01); *G06F 21/73* (2013.01); *H04L 9/0866* (2013.01); *H04L 2209/12* (2013.01)

(58) Field of Classification Search
CPC . H04L 9/3278; H04L 9/0866; H04L 2209/12; G06F 7/588; G06F 21/73
(Continued)

(56) References Cited

U.S. PATENT DOCUMENTS 9,529,570 B2 * 12/2016 Anderson ............... G06F 7/582
10,013,543 B2 * 7/2018 Walsh ................... H04L 9/3226
(Continued)

OTHER PUBLICATIONS

Yamamoto, D et al. "Uniqueness Enhancement of PUF Responses Based on the Locations of Random Outputting RS Latches"; International Association for Cryptologic Research, CHES 2011, LNCS 6917; Publication [online]. 2011 Retrieved from the internet: <URL: https://link.springer.com/content/pdf/10.1007/978-3-642-23951-9_26.pdf>:pp. 390-406.

*Primary Examiner* — Dereena T Cattungal
(74) *Attorney, Agent, or Firm* — Quarles & Brady LLP (57) ABSTRACT

The present disclosure relates to implementations of computing systems. Specifically, the disclosure describes implementations of physically unclonable functions (PUFs) that use ternary states for implementing security systems.

12 Claims, 8 Drawing Sheets

(51) Int. Cl.
*G06F 21/73* (2013.01)
*H04L 9/08* (2006.01)
(58) Field of Classification Search
USPC .......................................................... 380/44
See application file for complete search history.

(56) References Cited

U.S. PATENT DOCUMENTS

| | | | |
|---|---|---|---|
| 2009/0165086 A1* | 6/2009 | Trichina | G06F 7/588 |
| | | | 726/2 |
| 2013/0010957 A1* | 1/2013 | Yu | H04L 9/0844 |
| | | | 380/260 |
| 2015/0195088 A1* | 7/2015 | Rostami | H04L 9/3278 |
| | | | 380/28 |
| 2015/0301802 A1* | 10/2015 | Katoh | G11C 13/0002 |
| | | | 708/190 |
| 2015/0341792 A1* | 11/2015 | Walsh | H04L 9/3278 |
| | | | 713/171 |
| 2016/0087805 A1* | 3/2016 | Li | H04L 9/0866 |
| | | | 713/193 |
| 2017/0048072 A1 | 2/2017 | Cambou | |
| 2017/0310489 A1* | 10/2017 | Van Der Sluis | H04L 9/30 |
| 2018/0316493 A1* | 11/2018 | Kvatinsky | H04L 9/3242 |
| 2018/0351754 A1* | 12/2018 | Wallrabenstein | H04L 9/085 |
| 2019/0165956 A1* | 5/2019 | Adham | H04L 9/0838 |

* cited by examiner

| MEMORY | Parameter of PUF Generation | Comments |
|---|---|---|
| SRAM | Random flip of a 6T cell:<br>Start as a "0" or a "1" after power-up | Mainstream but not always secure |
| DRAM | Discharge the capacitors, then measure the voltage:<br>Get a "0" or a "1" | Needs constant refreshing |
| Flash | Partial programming, then measure threshold:<br>Get a "0" or a "1" | Slow programming |
| ReRAM | Variations of the value of the $V_{Set}$:<br>Define a "0" or a "1" | Quite novel |
| MRAM | Variations of the $R_{max}$ after programming:<br>Define a "0" or a "1" | Quite novel |

FIG. 1

If $N=256$, then $\mathcal{E} = 2^N \rightarrow \mathcal{E} = 3^N = 2^N \cdot 1.5^N$

FIG. 2

$\Delta \mathcal{E} = 1.5^N = 1.2 \cdot 10^{45} \approx 2^{150}$

FIG. 3

| Array of cells | Description |
|---|---|
| | ➢ A-cells: All of the cells of one PUF |
| | ➢ Testing the ternary states for challenge generation: |
| |    ➢ N X-cells (unstable cells) are blanked "X" |
| |    ➢ Strong "0" and "1" states are not blanked |
| | ➢ K additional strong cells are also blanked |
| | ➢ A total of n+k are blanked |
| | ➢ The remaining cells (B-cells in white) will be tested for response generation |

FIG. 4

$$\forall k, \quad n+k < N \quad N, n, \text{ and } k \text{ are integers}$$

FIG. 5

$$\mathcal{E} = \binom{N-n}{k} = \frac{(N-n)!}{k!\,(N-(n+k))!}$$

FIG. 6

$$\mathcal{E}^+ = \sum_{n=n_{min}}^{n=n_{max}} \frac{(N-n)!}{k!(N-(n+k))!}$$

| Step | PUF Challenge Generation:<br>Description of the Instructions | Data Stream/Information | Location |
|---|---|---|---|
| 102 | Identify the N cells "A" in the PUF for challenge generation | {A1, A2, ..., AN} | PUF or Server |
| 104 | Measure parameter $P$ for every "A" cell | {A1, A2, ..., AN} → {P1, P2, ..., PN} | PUF |
| 106 | Generate ternary data stream for $C \in \{0, 1, X\}$ n cells blanked "X" because $P$ is close to T | {P1, P2, ..., PN} → {C1, C2, ..., CN} | PUF |
| 108 | Randomly convert an additional k cells to "X" (out of the N-n cells that are not blanked) | {C1, C2, ..., CN} → {C'1, C'2, ..., C'N}<br>N "X" cells → (n+k) "X" cells | PUF |
| 110 | Convert ternary C' into a binary stream of data C" 0→(01) 1→(10) X→(11) or (00) | {C'1, C'2, ..., C'N} → {C"11, C"12, C"21, C"22, ..., C"N1, C"N2} | PUF or Server |
| 112 | C" is the PUF challenge in its final form Encrypt C" to generate the cipher M | M = E(C") | PUF or Server |
| 114 | Communicate M to the secure server Store in the secure memory | M | Server |

FIG. 10

| Step | PUF Response Generation and Authentication: Description of the Instructions | Data Stream/Information | Location |
|---|---|---|---|
| 202 | Extract M from the secure memory | M | Server |
| 204 | Decrypt M to generate the stream C" | C" = D(M) | PUF or Server |
| 206 | Convert binary C" into a ternary stream of data C' (01)→0  (10)→1  (11) or (00)→X | {C"11, C"12, C"21, C"22, ..., C"N1, C"N2} → {C'1, C'2, ..., C'N} | PUF or Server |
| 208 | Identify the N-(n+k) non-blanked B-cells in the PUF | {B1, B2, ..., BN-(n+k)} | PUF or Server |
| 210 | Keep track of the position of the "B-cells" within C' Generate D→Di = 0 when a "X" is present in C'i Generate D→Di = 1 when a B-cell is present in C'i | {C'1, C'2, ..., C'N} → {D1, D2, ..., DN} | |
| 212 | Measure parameter P for every "B-cell" | {B1, B2, ..., BN-(n+k)} → {P1, P2, ..., PN-(n+k)} | PUF |
| 214 | Generate binary data stream of responses R ∈ {0,1} | {P1, P2, ..., PN-(n+k)} → {R1, R2, ..., RN-(n+k)} | PUF |
| 216 | Convert the binary stream of responses R into the ternary data stream R' with {D1, D2, ..., DN} | {R1, R2, ..., RN-(n+k)} → {R'1, R'2, ..., R'N} N-(n+k) binary cells → N ternary cells | PUF or Server |
| 218 | Compare the challenges C' with responses R' for authentication | {C'1, C'2, ..., C'N} ↔ {R'1, R'2, R'N} C'i R'i Pair Matching | PUF or Server |

SECURING PHYSICALLY UNCLONABLE FUNCTIONS WITH ADDITIONAL RANDOM TERNARY STATES

CROSS REFERENCE TO RELATED APPLICATIONS

This application is a U.S. National Stage of PCT Application No. PCT/US18/25426 filed on Mar. 30, 2018, which claims priority to U.S. Provisional Ser. No. 62/480,151 entitled "Securing Physically Unclonable Functions with Additional Random Ternary States" filed on Mar. 31, 2017, the disclosure of which is hereby incorporated entirely herein by reference. Furthermore, this application is related to U.S. application Ser. No. 14/958,436 entitled "Physically Unclonable Function Generating Systems and Related Methods" filed on Dec. 3, 2015, U.S. application Ser. No. 15/347,721 entitled "Encoding Ternary Data for PUF Environments" filed on Nov. 9, 2016, and U.S. application Ser. No. 15/347,715 entitled "PUF-Based Password Generation Scheme" filed on Nov. 9, 2016 all of which applications are incorporated fully herein by reference.

FIELD OF THE INVENTION

The present disclosure relates to implementations of computing systems. Specifically, the disclosure describes implementations of physically unclonable functions (PUFs) that use ternary states for implementing security systems.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION OF PREFERRED EMBODIMENTS

Physically Unclonable Functions (PUFs) generated from hardware components can be the equivalent of human DNA or finger prints to strengthen the level of security of authentication protocols, and this as part of a set of cryptographic primitives. PUFs exploit intrinsic natural manufacturing variations, which are introduced during fabrication of the devices such as local variations in critical dimensions, doping levels of semiconducting layers, and threshold voltages. These variations make each device unique and identifiable from each other. The underlying mechanism of using a hardware device and its corresponding PUF in an authentication protocol is the creation of a large number of input-output interactions, called Challenge Response Pairs (CRPs), which are unique to each device. Once deployed during the authentication cycles, the PUFs are queried with challenges.

Usually PUFs need only 128 to 256 bits of physical computing memory, while commercial secure memory arrays (SM) that are integrated within secure micro-controllers have memory densities in the megabyte range. This makes semiconductor-based and other physical computing memory arrays suitable hardware devices from which to generate corresponding PUFs; such a PUF is referred to herein as a memory-based PUF. Non-limiting example memory types are provided with additional commentary in FIG. 1, and described further below; these examples include volatile and non-volatile memory types, particularly random-access memory (RAM) architectures such as static RAM (SRAM), dynamic RAM (DRAM), Flash memory, resistive RAM (ReRAM), magnetoresistive RAM (MRAM), and others.

One of the generic methods to generate CRPs is to characterize a particular parameter P of the cells of the array with a "built-in-self-test" (BIST) module. Each cell being different, the value of parameter P varies cell to cell, and follows a distribution with a median value T. For challenge and response generations, all cells with P below T can be then considered as "0", all other cells are considered as "1". The method produces one or more streams of binary data representing the assigned values of the cells. The resulting streams of data generated by the method can be used as cryptographic primitives to authenticate the memory array because the binary value sequence represented by the data stream randomly varies between arrays due to manufacturing variations. As it is presented below in the present disclosure, one example embodiment of Addressable PUF Generators (APG) uses memory-based PUFs.

Binary data streams can suffer from quality issues due to there being only two possible states of the cell. In particular, the BIST module may generate, for some cells, a value for parameter P that is very close to the median value T and/or is shaky or otherwise unstable. In some cases, there may be enough variation in a cell's physical properties that the value parameter P can move from below the median value T to above it, and vice-versa, depending on the physical properties at a given moment. A mismatch between the BIST result for a cell at encoding time and the BIST result for the cell at the time of challenge-response can cause the CRP authentication to fail. The present disclosure overcomes this and other drawbacks by describing how the quality of a memory-based PUF can be enhanced with the use ternary states. Rather than testing the cells to simply sort them into traditional binary "0" and "1" states as a function of the value of parameter P and the transition threshold T, the cells that are too close to T, shaky, or unstable may carry the ternary state "X", according to one embodiment. The remaining "0" and "1" states are thereby more predictable when subjected to repetitive queries, which reduces the CRP error rates of the PUFs.

An objective of the APG architecture is to enhance the security of the cyber physical systems (CPS), and to make attacks such as the hacking of databases of UserID-Password pairs more difficult. The novel database-free password generator architecture is based on a new component, the APG. APGs can generate passwords and authenticate a client on the network without having access to storage elements or look-up tables (e.g., cryptographic tables) with UserID-Password pairs. These APG architectures use a large number of memory-based PUFs, as described below, including true random number generators and hash functions.

Figure 2:
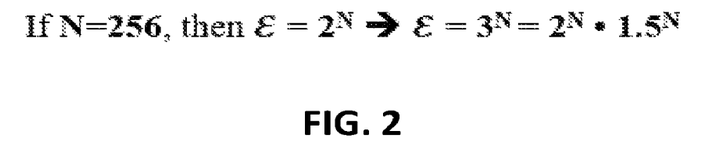
FIG. 2 is a mathematical formula for an example expression of randomness in a system in accordance with this disclosure.
Figure 3:
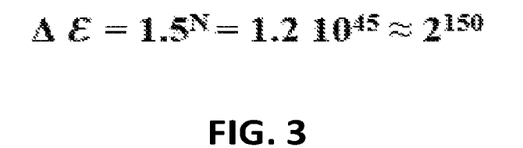
FIG. 3 is a mathematical formula for an example number of possible PUF configurations applying ternary states.

Typically, a brute force attack against a PUF will assume total randomness of the PUF; the higher the entropy (i.e., the rate of randomness) of a PUF, the greater its resistance to a brute force attack. Entropy can be increased by increasing the length of a PUF; also, as shown herein, entropy can also be increased by introducing a third possible state for each cell represented in the underlying memory. Referring to FIG. 2, if N cells are used to generate a challenge, the number of possible configurations ε of a data stream increases with the use of ternary states: for a binary data stream, there are $2^N$ possible configurations; for a ternary data stream, there are $3^N$, possible configurations. If N=256, $3^N=2^N \times 1.5^N$; the total increase in the number of possible configurations due to the use of ternary states where N=256 is $1.5^N$, or approximately $2^{150}$, as described in FIG. 3.

The attack that may be prevented is one in which the crypto-analyst has access to the PUFs, knows how to measure parameter P, can rank all cells based on the value of parameter P, can find the value of the transition threshold T, and can thus approximatively find a way to correctly blank the unstable cells with an "X". For example, if the PUF has N=256 cells, then the number of possible responses for the crypto-analyst can be reduced to 256 which is undesirable for cryptography and cryptosystems.

Figure 4:
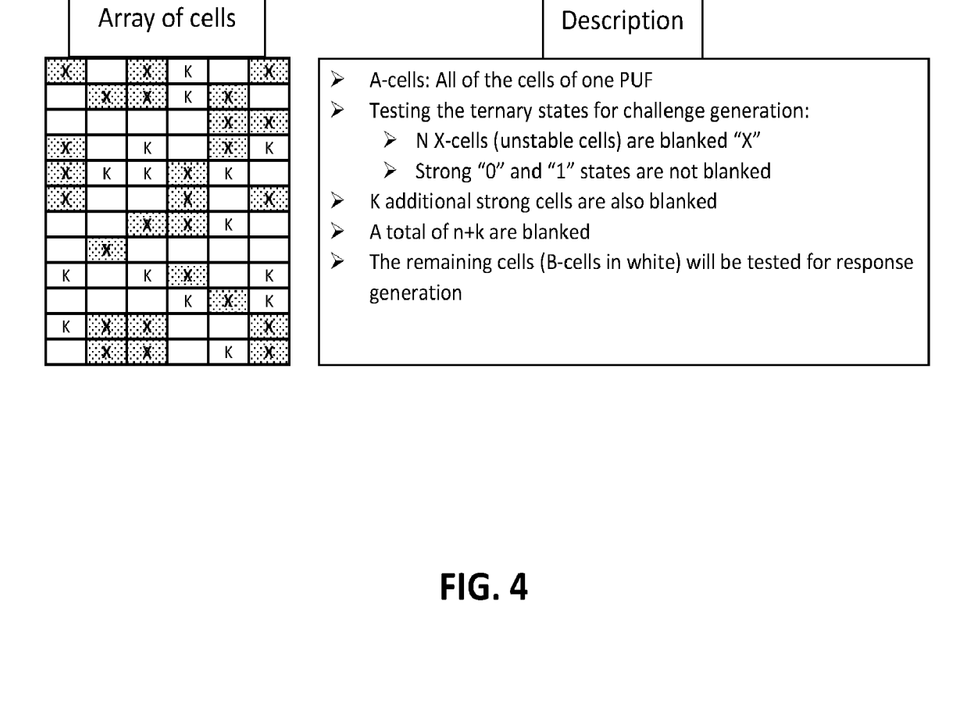
FIG. 4 depicts a table and associated process for an example partitioning of cells of a memory-based PUF.

The new method that is presented herein has the objective of eliminating the attack scenario presented above. The method, as it is shown in FIG. 4, is based on the partial random blanking of the cells of a memory-based PUF.

Figure 5:
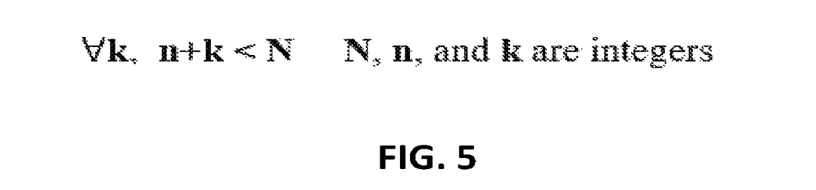
FIG. 5 is a mathematical formula for limiting random numbers.

During challenge generation, the totality of the cells of a memory-based PUF, referred to as the A-cells, are tested and sorted into a first subset containing the cells that have a strong "0" or "1" state and a second subset containing the "unstable" cells that could vacillate between "0" and "1" states as described above. The cells in the second subset are "blanked" by assigning to each of the cells an "X" state, as illustrated in FIG. 4. These cells are blanked due to their poor quality. Additionally, an arbitrary and random number of cells of the PUF that have strong "0" and "1" states are also blanked with an "X". The remaining cells that have strong "0" or "1" state are not blanked. To take an example PUF with N cells, there may be n number of unstable cells that need to be blanked (e.g., because their parameter P is too close to the transition point T). An additional number of k cells may also be randomly selected to be blanked. In some embodiments, limitations may be placed on the random selection of cells. For example, the number k of randomly-blanked strong cells may be limited according to the equation in FIG. 5.

The resulting challenge will be a stream of N ternary bits with values of either "0", "1", or "X". In an example embodiment of this method, the data stream is converted into a stream of 2N binary bits by transforming the "0's" into a (01), the "1's" into a (10), and the "X's" into either a (00) or a (11). The challenges can also be encrypted and may be stored in a secure server. Other possible methods to handle data streams of ternary bits may be used in other embodiments.

During response generation, only the cells of the PUF that are not blanked with an "X" are tested again. The authentication is positive if the cells that are tested yield the same data stream and are similar to the one that was tested during challenge generation. The challenge-response-pair (CRP) error rates have to be low enough for positive authentication.

Figure 6:
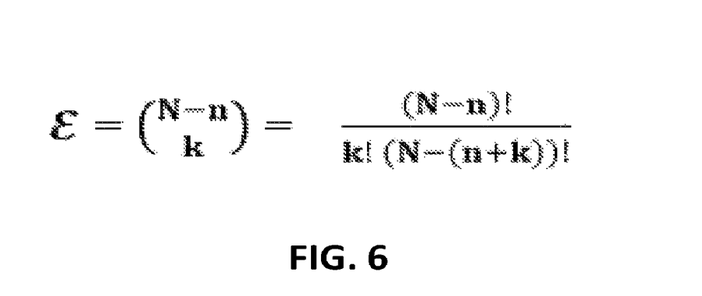
FIG. 6 is a mathematical formula for describing possible configurations in an example embodiment in accordance with this disclosure.

If a crypto-analyst knows the exact number of unstable cells in a PUF as well as the number of strong cells that are randomly blanked, such as depicted in FIG. 4, the total number of possible configurations ε can be related to the entropy. FIG. 6 illustrates a mathematical equation that may be used to compute a number of possible configurations for the scenario where the number of unstable and randomly blanked cells is known. In some embodiments, including in any of the methods of the current disclosure, the crypto-analyst may not know precisely how many unstable cells or randomly blanked cells are in a given PUF. This increases the number of possible configurations $\varepsilon^+$ to a number that is higher than the number ε that could be calculated with the known number of cells (i.e., $\varepsilon^+ > \varepsilon$).

Figure 7:
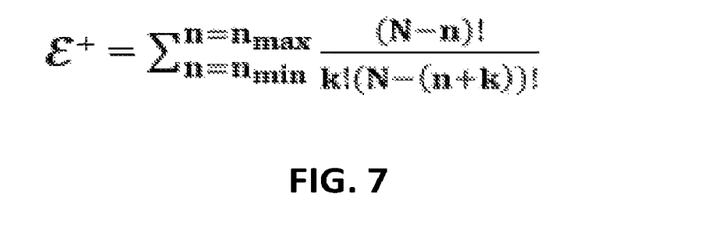
FIG. 7 is a mathematical formula for describing possible configurations in another example embodiment in accordance with this disclosure.

FIG. 7 illustrates the mathematical equation used to compute the revised number of possible configurations $\varepsilon^+$ when neither the number of unstable or randomly blanked cells is known. In FIG. 7, the variables $n_{min}$ to $n_{max}$ represent a possible range of unstable cells that may be reasonable for crypto-analysis. The largest number of configurations occurs when the number of unstable cells is minimized. The crypto-analyst also cannot know the precise number of randomly assigned blank cells. In one embodiment, number of randomly blanked cells k can be varied. The entropy generated within this example embodiment is then converging with a PUF configuration that approaching pure randomness of ternary states within the example N number of cells.

In summary, blanking all unstable cells with ternary states "X", together with the blanking of an additional arbitrary number of random "strong" cells, can result in PUFs having a low CRP error rate and high entropy level. This could be used to protect from a crypto-analysis attack.

One important element of this present method is randomness. Particularly in one example embodiment, where random selection of an additional number of strong cells k to be blanked is chosen from the cells that are left un-blanked after the testing of all the cells of a PUF. There are several ways to do this random cell selection. A first method to select k cells is based on the generation of a true random number and then to blank 50% of the strong cells of the PUF that have the state (i.e., zero or one) corresponding to a selected value for the random number. For example, if the selected value for the random number is associated with the "0" state, a cell of the PUF can be blanked either because it is unstable (e.g., parameter P is too close to the transition T), or because the cell has a "0" state. As a result of such a method, the number of randomly blanked cells could be up to half of the strong cells on a PUF. To reduce the number of randomly blanked cells, a second true random number can be used to reverse some of the randomly blanked strong cells (i.e., return them to their previous state). A third iteration could be applied to increase the number of blanked cells. A different true random number could be used to blank half of the remaining cells. With successive iterations, the number of randomly blanked cells k can be adjusted up or down between 0 and the maximum number of strong cells on a PUF.

Figure 8:
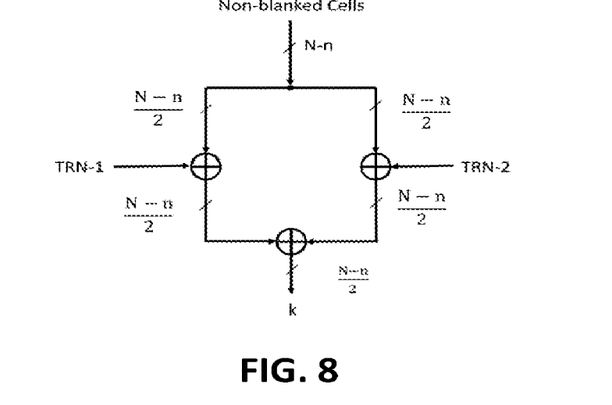
FIG. 8 is a diagram illustrating a system for using two random numbers to "blank" cells using PUF configurations in accordance with this disclosure.

A second method to randomly select k cells to blank is based on two random numbers TRN-1 and TRN-2 that can be applied in parallel to the non-blanked cells. This is illustrated in FIG. 8. An output of two XOR gates can be further XORed to generate an output. This method increases the randomness of k.

Figure 9:
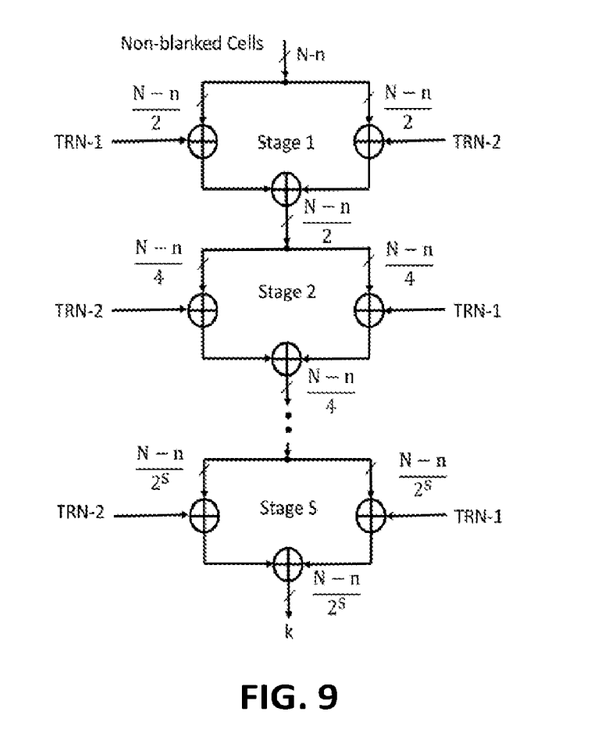
FIG. 9 is a diagram illustrating a system for linking random numbers to "blank" more cells using PUF configurations in accordance with this disclosure.

A third method to generate randomly blanked k cells is based on a scheme where the number of additional cells k can be varied by choosing a particular number of stages. This scheme is shown in FIG. 9. In FIG. 9, it is shown how to blank a variable number of cells. For this purpose, a stage compression scheme can be used. Each stage reduces the number of cells to be blanked by a factor of 2.

Figure 10:
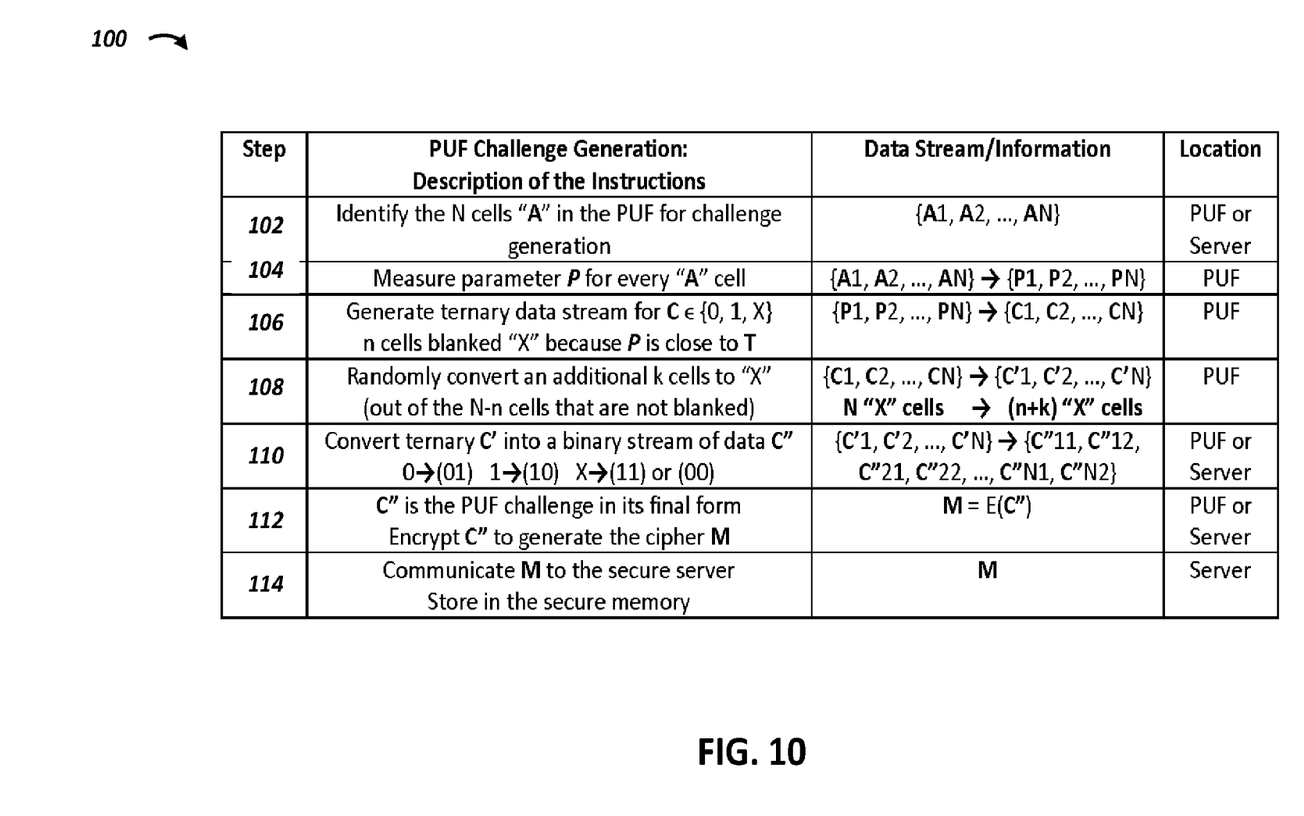
FIG. 10 is a diagram illustrating a table containing data outlining an example protocol for PUF challenge generation.

FIG. 10 illustrates an example method 100 for implementing a protocol (e.g., as described above) executed by a system to generate challenges for PUF CRPs. At step 102, the system may identify the N cells of the PUF that will be used for the challenge generation. At step 104, the system may determine a value for the parameter P for each of the N identified cells. As part of this step or the subsequent step 106, the system may assign a state to each of the cells based on the corresponding value of the parameter P for the cell. For example, as described above, the system may determine a median value T of the values of the parameter P for the N cells, and may assign a state "1" to each cell having a corresponding value of P that is above a threshold range around T, and a state "0" to each cell having a corresponding value of P that is below the threshold range, and may "blank" (e.g., by assigning a state "X," as described above, to) each of the cells where the value of P is within the threshold range, or is otherwise so unstable that it may vacillate between a state "1" and a state "0" depending on various conditions.

At step 106, the system may generate or receive one or more data streams comprising the states of the N cells. For example, the system may generate a data stream comprising a plurality of bits each corresponding to one of the cells and having a value of "0", "1," or "X." At step 108, the system may increase arbitrarily the number of blanked "X" cells. As part of this step, one possible embodiment of the insertion of arbitrary "X" cells is to use random numbers, as described by the methods above. Using this protocol, a third party should not be able to differentiate a C" PUF challenge from the challenges generated from a memory array with ternary states. At step 110, the system may convert the resulting (i.e., from step 108) ternary data stream into a binary data stream. For example, the system may assign a binary value to each of the three states, and may replace each of the bits in the ternary data stream with the binary value corresponding to the state represented by the bit. At step 112, the system may encrypt the resulting binary data stream (i.e., the PUF challenge) to generate a cipher M, and at step 114 the system may send the cipher M to a secure server for later use in a CRP.

Figure 11:
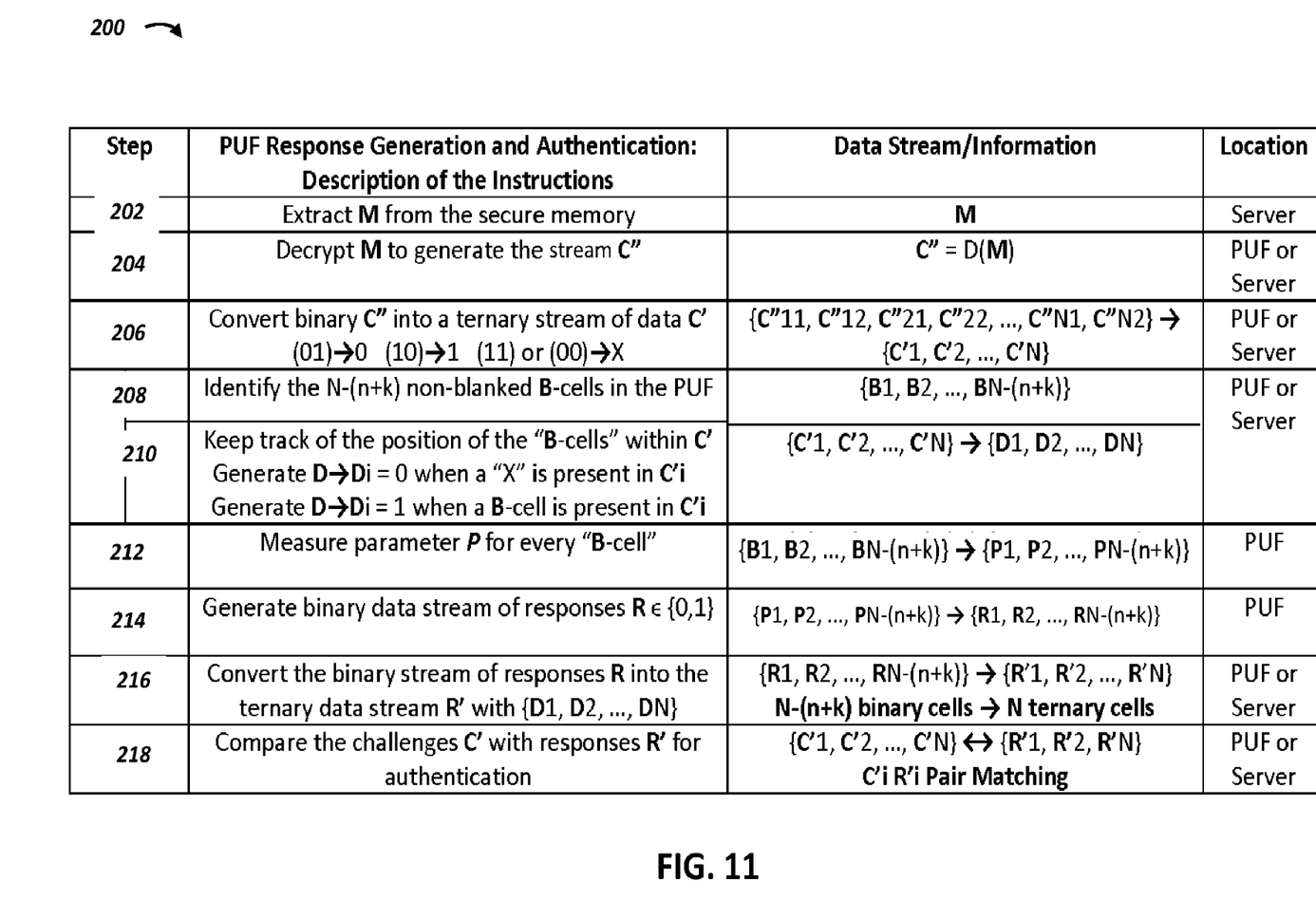
FIG. 11 is a diagram illustrating a table containing data outlining an example protocol for PUF response generation.

FIG. 11 illustrates an example method 200 executed by a system to implement a protocol for response generation and authentication, as described above. With this protocol, a third party should not be able to differentiate the generation of R'PUF responses from the responses generated from a memory array with ternary states. The challenges contain all information related to finding of the location of the B-cells (the strong, non-blanked cells as depicted in FIG. 4). These are the ones needed to be tested for PUF responses. So, at step 202, the system may obtain the cipher M from the memory of the secure server in which the cipher M is stored, and at step 204 the system may decrypt the cipher M into the binary data stream C" representing the PUF challenge (i.e., generated using the method 100 of FIG. 10). At step 206, the system may convert the decrypted binary data stream back into a ternary data stream using the binary value-to-state relationships previously used to convert the original ternary data stream into the binary data stream. For example, as shown in FIG. 11, the binary values stored in each consecutive pair of elements $\{C"i1, C"i2\}$, i=1 ... N, (e.g., bits) in the binary stream C" may be mapped, using a conversion key, to a single element $\{C'i\}$ in the ternary stream C'; an example conversion key maps each possible binary value pair to one of the ternary states as follows: $\{0,1\}$ becomes $\{0\}$; $\{1,0\}$ becomes $\{1\}$; and $\{0,0\}$ and $\{1,1\}$ each become $\{X\}$.

At step 208, the system may identify each of the B-cells (i.e., the strong cells that were not blanked during challenge generation) in the presented PUF being authenticated (i.e., being used to respond to the challenge). For example, the system may determine which of the elements in the ternary data stream C' have a value of zero or one (i.e., as opposed to 'X'). Where there are N total cells, n of the cells are blanked by necessity (i.e., are unstable), and k of the cells are randomly blanked, the number of B-cells is N−(n+k). The system may, in some embodiments, generate a data stream B containing N−(n+k) elements, and may store the values (i.e., zero or one) for each of the identified B-cells in the data stream B in sequence as they appear in C'. At step 210, the system may create or use one or more mechanisms to track the position within the ternary data stream C' of each of the B-cells. For example, the system may generate a correlated data stream D containing N elements, in which each of the sequential elements $\{Di\}$ has a value of zero if the corresponding element $\{C'i\}$ of the ternary data stream C' has state "X," and a value of one if $\{C'i\}$ has state zero or one (i.e., corresponds to a B-cell).

At step 212, the system may calculate values for the parameter P for all of the cells in the PUF that correspond to cells that are identified as B-cells in the challenge (i.e., the cells in the data stream B). At step 214, the system may compare the calculated values to the median value T to produce a corresponding state (i.e., of zero or one) for each cell, as described above. In the illustrated example, the resulting states are stored in a binary data stream R. At step 216, this binary data stream R may be combined with the data stream D that tracks the positions of the B-cells within the challenge, to produce a ternary data stream R' representing the complete response to the challenge represented by C'. At step 218 the system may compare each corresponding element of the data streams C' and R' to each other to determine whether the response matches the challenge. The authentication is positive if the error rates during CRP matching is low enough. A low error rate can only be realized if the respective position of the blanked "X" cells is accurate and if the measurement of parameter P is reproducible between challenges and responses.

Figure 12:
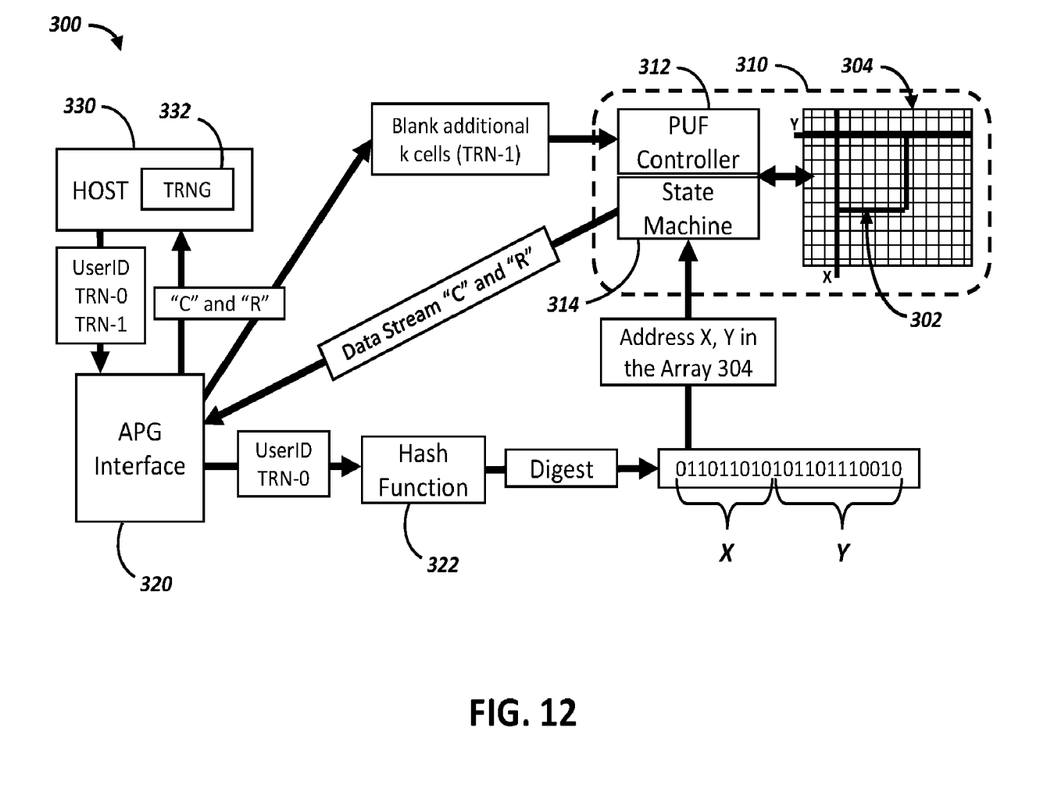
FIG. 12 is a block diagram of an addressable PUF generator (APG) architecture.

FIG. 12 illustrates an example hardware implementation of an APG architecture 300. The architecture 300 and any of its hardware and/or software components may be implemented in or otherwise use computing resources of one or more computing devices, including without limitation secure server computers, personal computers, and mobile computing devices, and computer memory modules, processors, and other internal and peripheral components thereof. The diagram of the architecture 300 refers to components and data elements described both generally and by specific example within this detailed description, including without limitation the generation and use of totally random numbers (TRNs) in encoding challenge ("C") and response ("R") data streams for a PUF 302.

One or more PUFs 302 can be organized as arrays of an APG 310. For example, a PUF 302 may be a subset of locations (e.g., a two-dimensional array of (x,y) coordinates) within a larger array 304 of cells of a memory device as described above. In such an implementation, the method can then be inserted as part of the circuitry of the APG 310 to protect the array of PUFs 302. For example, an APG 310 may include a controller 312 and a state machine 314, and may further include or communicate with an APG interface 320. The controller 312 and state machine 314 may cooperate to generate the challenge data stream(s) upon initiation of the method, and then later may cooperate to generate the response data stream(s) in response to receiving the challenges (i.e., for authentication of the PUF 302). The APG interface 320 may exchange data with the controller 312 and/or the state machine 314, and also with a host system 330, such as a secure server that performs the PUF 302 authentication. The method to convert a data stream of bits with ternary states into a data stream of bits with binary states, or the reverse, can be based on the association of 0 state with (01), 1 state with (10), and X state with either (00) or (11). The X states can alternate from (00) to (11) with a randomization methods that can use random numbers.

The challenges generated using the method discussed above may use a randomization process for the blanking of the additional k "X" cells that can be based on a random number TRN-1. After authentication, and the generation of matching responses, the protocol can generate different challenges based on a different random number that can be kept for a subsequent authentication. Thus, the method reduces its exposure to a crypto-analyst's ability to intercept challenges by using CRPs only once. In an example embodiment, TRNs such as TRN-0 and TRN-1 may be generated by a TRN generator 332 of the host system 330 and send to the APG interface 320. The host system 330 may further send to the APG interface 320 a UserID of a particular client or terminal; the APG interface 320 may use the UserID and a first random number TRN-0 as inputs to a hash function 322 that converts the UserID into an address where a PUF 302 is located. For example, the hash function 322 may generate a string of bits with binary values that can be parsed into the (x,y) coordinate within the array that is the starting element of the PUF 302. The address of the PUF 302 may be delivered to the APG 310 for the controller 312 and state machine 314 to use when generating the challenges and responses. In order to generate a challenge from a PUF in question, a random number TRN-1 is also generated to blank the additional arbitrary k cells from the PUF; without this information, a crypto-analyst cannot extract a correct response from the PUF. The APG interface 320 may receive the random number TRN-1 from the host system 330 and send it to the APG 310 for the controller 312 to use in generating the challenges as described above.

Figure 1:
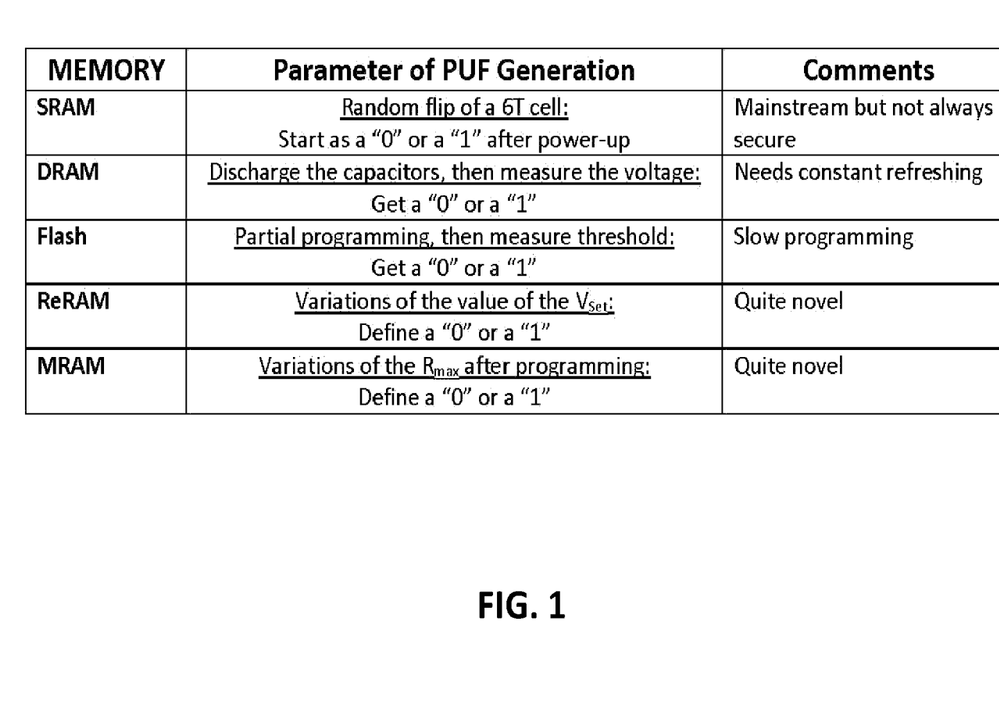
FIG. 1 depicts a table illustrating different memory-based physically unclonable functions (PUFs).

Example embodiments of the method described above may implement PUFs 302 that are based on memory arrays of any type, including but not to be limited to the examples shown in FIG. 1 and any other types of memory arrays that can be arbitrary blanked with "X" states as described above.

The present method can be extended beyond memory-based PUFs. In some embodiments, the PUFs can be used with memories that have known patterns stored such as cryptographic keys, biometric prints, or passwords. A challenge can be generated by extracting such patterns and blanking them randomly and arbitrarily. Crypto-analysts able to read the memory are then prevented from finding a response matching the challenge. This method may be easier to implement on legacy systems.

This method is directly applicable to an array of any number of PUFs. These arrays may be based on methods such as arrays of ring oscillators, arrays of gate delays, unclonable images, PUF sensors, or similar. In such a case, the challenges may either be streams of N ternary bits (0, 1, X), or streams of 2N binary bits (0, 1).

This method to add arbitrary and random "X" cells may not have to be combined with the use of ternary states to blank the unstable cells. The method may be used with binary PUFs or with PUFs having more than three states such as quaternary state PUFs.

A cryptographic protocol may be based on reference pattern generation that is made of data streams, challenges, and subsequent pattern generation also made of data streams and responses, which are used to authenticate components when the challenge response pairs are similar. In this protocol, random and arbitrary portions of the data streams which are part of the challenges are blanked with an "X" state, while the remaining portions of the data stream consists of the stream of binary bits, "0", and "1" previously generated. A correct authentication needs a response protocol in which the positions of the portions of the data streams that are blanked with an "X" state are correctly identified, and the remaining data stream is similar than the one generated during challenge generation. The data streams may be the result of reading the content of memory arrays, which may be based on cryptographic keys, biometric prints, passwords, unclonable images, or other databases. The data streams may be the result of challenges generated by physical unclonable functions (PUF) that are based on ring oscillators, gate delays, sensor PUFs, or memory-based arrays. The memory arrays may be made of static RAMs (SRAMs), dynamic RAMs (DRAMs), Flash, electrically erasable programmable ROMs (EEPROMs), programmable ROMs (PROMs), one-time programmable arrays, Resistive RAMs (ReRAMs), conductive bridging RAMs (CBRAMs), magnetoresistive RAMs (MRAMs), phase change RAMs (PCRAMs), or carbon nanotube-based memories. The PUFs may generate binary, ternary, quaternary, or multi-state data streams. The approach may be used to convert a random and arbitrary portion of the data streams that are part of the challenges blanked "X" state based on random numbers, pseudo-random numbers, or true random numbers. The random numbers may be integrated to the positions of non-blanked cells to select k cells. These k cells can be additional to the list of blanked cells. The protocols can be based on random numbers that change as much as every time after authentication in order to generate new challenges for subsequent authentications.

In one aspect, this disclosure provides a method including the steps of: receiving a first data stream encoding a plurality of states of a cell, the plurality of states represented by binary bits and X states; and, authenticating the first data stream using a physically unclonable function (PUF) by determining whether a set of first locations of the binary bits and X states within the first data stream corresponds to a set of second locations of binary bits and X states in a second data stream generated using the PUF. The second data stream may be generated by reading a content of a memory array of the PUF. The PUF may include at least one of a ring oscillator, gate delay, sensor, and memory-based array. The method may further include the step of reading the first data stream from a memory array. The memory array may include at least one of an SRAM, DRAM, Flash, EEPROM, PROM, one-time programmable array, Resistive RAM, CBRAM, MRAM, PCRAM, or carbon nanotube-based memory. The PUF may be contained in an array of addressable PUF generators. The PUF may generate binary data streams, ternary data streams, quaternary data streams, multi-state data streams, or a combination thereof.

A first portion of the first data stream related to the X states may be based on random numbers, pseudo-random numbers, true random numbers, or a combination thereof. The random numbers may be used to select a plurality of k cells, where the k cells are in addition to a plurality of cells comprising a second portion of the first data stream, the second portion also being related to the X states. The random numbers may be changed after each authentication in order to generate new challenges for subsequent authentications. The first data stream may include bits with the ternary states, the bits converted from a data stream of bits with binary states based on an association of a 0 state with (01), a 1 state with a (10), and an X state with either a (00) or (11). The X states may be able to alternate between (00) and (11).

Authenticating the first data stream may include the steps of: receiving a number k used to produce the second data stream; determining that the second data stream includes, in the set of second locations, k blanked locations that were changed from one of the binary bits to the X state; and using k to determine the set of first locations of the binary bits and X states. Using k to determine the set of first locations of the binary bits and X states in the first data stream may include the step of determining, based at least in part on k, a first subset of locations in the first data stream that correspond to a plurality of strong cells in the PUF, each of the plurality of strong cells being represented in the first data stream by one of the binary bits, the first subset of locations being included in the set of first locations. The number k may be selected based on one or more random numbers, and may be used to produce the second data stream by selecting k strong cells of the PUF and changing each location in the second data stream corresponding to one of the k strong cells from one of the binary bits to the X state.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of authenticating a physically unclonable function (PUF), comprising:
   generating a PUF challenge by a method comprising:
   generating a first data stream encoding ternary states for a plurality of addressable cells of the PUF, the ternary states corresponding to 0, 1 or X states;
   selecting a subset of the addressable cells reflected in the first data stream having 0 or 1 states, and for the selected cells, changing the encoded state to an X state, resulting in a second data stream encoding ternary states corresponding to 0, 1 and X states;
   storing the second data stream,
   receiving a data stream generated by measuring PUF responses;
   comparing the second data stream to the received data stream, and;
   authenticating a PUF on the basis of the comparison.

2. The method of claim 1, wherein the first data stream is generated by reading a content of a memory array of the PUF.

3. The method of claim 1, wherein the PUF includes at least one of a ring oscillator, gate delay, sensor, and memory-based array.

4. The method of claim 1, including reading the first data stream from a memory array.

5. The method of claim 4, wherein the memory array includes at least one of an SRAM, DRAM, Flash, EEPROM, PROM, one-time programmable array, Resistive RAM, CBRAM, MRAM, PCRAM, or carbon nanotube-based memory.

6. The method of claim 1, wherein the PUF is contained in an array of addressable PUF generators.

7. The method of claim 1, wherein the PUF generates binary data streams, ternary data streams, quaternary data streams, multi-state data streams, or a combination thereof.

8. The method of claim 1, wherein authenticating the PUF on the basis of the comparison comprises:
   identifying the locations of PUF cells corresponding to cells in the second data stream having 0 or 1 states;
   measuring a response of the identified PUF cells to determine their state, and
   comparing the states of the identified PUF cells with the states of corresponding cells in the second data stream.

9. The method of claim 1, wherein selecting a plurality of the addressable cells reflected in the first data stream having 0 or 1 states, and for the selected cells, changing the coded state to an X state, resulting in a second data stream is based on random numbers, pseudo-random numbers, true random numbers, or a combination thereof.

10. The method of claim 8, wherein the random numbers are changed after each authentication in order to generate new challenges for subsequent authentications.

11. The method of claim 1, wherein the first data stream comprises bits with the ternary states, the bits converted from a data stream of bits with binary states based on an association of a 0 state with (01), a 1 state with a (10), and an X state with either a (00) or (11).

12. The method of claim 11, wherein the X states can alternate between (00) and (11).

* * * * *